United States Patent [19]

Bahl et al.

[11] Patent Number: 5,455,889
[45] Date of Patent: Oct. 3, 1995

[54] LABELLING SPEECH USING CONTEXT-DEPENDENT ACOUSTIC PROTOTYPES

[75] Inventors: Lalit R. Bahl, Amawalk, N.Y.; Peter de Souza, San Jose, Calif.; P. S. Gopalakrishnan, Yorktown Heights; Michael A. Picheny, White Plains, both of N.Y.

[73] Assignee: International Business Machines Corporation, Armonk, N.Y.

[21] Appl. No.: 14,966

[22] Filed: Feb. 8, 1993

[51] Int. Cl.$^6$ .................... G10L 5/06; G10L 9/00
[52] U.S. Cl. .............. 395/2.45; 395/2; 395/2.4; 395/2.51; 395/2.52; 395/2.65; 395/2.63
[58] Field of Search .................. 381/36–53; 395/2, 395/2.1–2.87

[56] References Cited

U.S. PATENT DOCUMENTS

| | | | |
|---|---|---|---|
| 4,819,271 | 4/1989 | Bahl et al. | 381/43 |
| 4,820,059 | 4/1989 | Miller et al. | 381/43 |
| 4,933,973 | 6/1990 | Porter | 381/43 |
| 4,977,599 | 12/1990 | Bahl et al. | 381/43 |
| 5,165,007 | 11/1992 | Bahl et al. | 395/2 |
| 5,168,524 | 12/1992 | Kroeker et al. | 381/43 |
| 5,208,897 | 5/1993 | Hutchins | 395/2 |

OTHER PUBLICATIONS

Schmidbauer et al, "An LVQ based reference model for speaker–adaptive speech recognition"; ICASSP–92: 1992 IEEE International Conference on Acoustics, Speech and Signal Processing, pp. 441–444 vol. 1. 23–26 Mar. 1992.

Sehhati, "An interactive tool for segmentation and acoustic–phonetic analysis of speech SPANEX"; Sixth International Conference on Digital Processing of Signals in Communications, pp. 251–255, 2–6 Sep. 1991.

Kepuska et al, "Phonemic speech recognition system based on a neural network"; SOUTHEASTCON '89 Proceedings. Energy and Information Technologies in the Southeast, pp. 770–775 vol. 2. 9–12 Apr. 1989.

*Primary Examiner*—Robert W. Downs
*Assistant Examiner*—Tariq Hafiz
*Attorney, Agent, or Firm*—Robert P. Tassinari, Jr.; Sterne, Kessler, Goldstein & Fox

[57] ABSTRACT

The present invention relates to labelling of speech in a context-dependent speech recognition system. When labelling speech using context-dependent prototypes the phone context of a frame of speech needs to be aligned with the appropriate acoustic parameter vector. Since aligning a large amount of data is difficult if based upon arc ranks, the present invention aligns the data using context-independent acoustic prototypes. The phonetic context of each phone of the data is known. Therefore after the alignment step the acoustic parameter vectors are tagged with a corresponding phonetic context. Context-dependent prototype vectors exists for each label. For all labels the context-dependent prototype vectors having the same phonetic context as the tagged acoustic parameter vector are determined. For each label the probability of achieving the tagged acoustic parameter vector is determined given each of the context-dependent label prototype vectors having the same phonetic context as the tagged acoustic parameter vector. The label with the highest probability is associated with the context-dependent acoustic parameter vector.

14 Claims, 8 Drawing Sheets

5,455,889

LABELLING SPEECH USING CONTEXT-DEPENDENT ACOUSTIC PROTOTYPES

TECHNICAL FIELD

The present invention relates generally to labelling of speech in speech recognition systems. Specifically, the present invention relates to context-dependent labelling of speech.

BACKGROUND ART

Phonologists have attempted to find the smallest set of sound units, called phonemes, sufficient to distinguish among different utterances. Each phoneme is represented by a symbol. This symbol is called a phone. For instance, /p/ and /b/ are distinct phonemes of English, because they distinguish such words as pin and bin from each other. However, it should not be thought that acoustic intervals labeled by the same phoneme would necessarily sound alike. The acoustic variants of a given phoneme are called allophones. Different sounds may be allophones of the same phoneme if at least one of two conditions is met that prevents them from distinguishing utterances. Two allophones either never occur in the same sound environment (such as the aspirated word initial p of pot and the unaspirated final p of top) or if they do, the substitution of one for the other does not produce a different word, but merely a different pronunciation of the same word.

A phonetic alphabet must be enlarged to lend itself to convenient pattern recognition by an acoustic processor. The region of the recognition space used that corresponds to the acoustic variants of a given phoneme will have to be partitioned into a minimal number of compact, convex subregions, each subregion to be labelled by a different symbol, referred to as sub-phone The union of all of these subregions forms a convex region which is represented by a symbol called a phone. Since the design of the structure of the speaker production model and of the acoustic processor should be guided by phonetic experience, it will be desirable to keep the partitioning system such that the obtained subregions are made up of more or less traditional perception units. For a more detailed discussion see *Continuous Speech Recognition by Statistical Methods* Frederick Jelinek, Proc. of the IEEE, Vol 64, No. 4, pp 532–556 (April 1976), herein incorporated by reference.

Traditional speech recognition systems have used Hidden Markov Models (HMM's) to represent a phoneme or to represent a label. See U.S. Pat. No. 4,819,271 to Bahl et al., herein incorporated by reference. Context-dependent speech modeling systems typically utilize Hidden Markov Models. Hidden Markov Models are well known in the field of speech recognition. In general a Hidden Markov Model is a sequence of probability distributions, states and arcs. Arcs are also called transitions. An observation vector is an output of the Hidden Markov Model. Associated with every arc is a probability distribution, e.g., a gaussian density. The probability distribution are distributions on a series of observation vectors that are produced by an acoustic processor. When performing Hidden Markov Model speech recognition, one essential step is characterizing each word in a vocabulary as a sequence of Hidden Markov Models. Depending upon the model, each Hidden Markov Model represents either an entire word or a phoneme.

A Markov Model speech recognition system typically includes an acoustic processor which converts a speech input into a string of labels. The labels in the string are assigned to the output of the acoustic vector by utilizing a set of predefined prototypes where each prototype corresponds to a cluster of vectors in n-dimensional space that defines all speech. Based upon the values of the n characteristics, an n-component acoustic parameter vector is defined. An acoustic parameter vector is one type of feature vector. As discussed supra speech is categorized into convex regions. Each convex region has a prototype vector associated with it. A prototype vector is a representative vector for the convex region. A selection is made as to which convex region a given acoustic parameter vector belongs in. In general, when determining which convex region an acoustic parameter vector should be associated with, the acoustic parameter vector is compared to the prototype vector associated with each label. As stated earlier, each convex region is identified with a respective label. For each interval of time, typically a centisecond, the acoustic processor generates a signal representing an acoustic parameter vector; the convex region into which the acoustic parameter vector belongs is then determined; and the label for that convex region is associated with the time interval. The acoustic processor thus produces a string of labels as its output. Context-independent speech recognition systems model a given phoneme individually. Context-dependent speech recognition systems model a given phoneme utilizing the preceding and/or following phoneme. In order to adequately model context-dependent speech, significantly more convex regions are necessary than when context-independent speech is modelled.

Context-independent label prototype vectors are determined using an individual phoneme. The preceding or following phoneme are not considered during the development of these context-independent label prototype vectors. However, when words are spoken, a particular phoneme actually varies depending upon the previous phoneme and/or the following phoneme. The articulation of a sound may vary substantially when articulated in context compared to the articulation of the sound in isolation. Thus, depending on what sounds precede and follow a phoneme, the pattern of energy concentrations of a phoneme will change. Therefore, creating label prototype vectors which account for neighboring phonemes improves modelling of continuous speech. Accounting for the phonetic context results in context-dependent label prototype vector signals. Each phoneme has many variations depending upon the neighboring phone. The combination of a target phoneme and neighboring phonemes is called the phonetic context of the target phoneme.

Another type of Hidden Markov model based speech recognition system relies on arc ranks as derived from context-dependent arc prototypes. In general, this type of system reduces an inputted speech signal into signals representing a sequence of continuous valued acoustic parameter vectors by an acoustic processor. Then each arc assigns a conditional probability to each acoustic parameter vector. A rank processor then sorts these conditional probabilities and outputs the rank of each acoustic parameter vector based upon these conditional probabilities. Such a system is termed to be based upon arc ranks.

In a Hidden Markov Model arc rank speech recognition system training and recognition are performed in terms of ranks and not in terms of acoustic labels. In order to model speech with greater accuracy than other systems, context-dependent arc prototypes are used. Using arc ranks obviates the need of a labeller when training or recognizing a speaker.

However, developing a recognizer requires the use of acoustic labels for some purposes such as the automatic creation of Hidden Markov Model word models. Therefore a labeller that can operate on context-dependent prototypes is a necessity.

In order to label a frame of speech using context-dependent label prototype vector signals it is desirable to know the exact phonetic context of the frame. In practice this can never be known exactly, but it can be estimated from a Viterbi alignment. In general, the Viterbi alignment aligns each label with its corresponding phone. Since training data is used, the phonetic context of each phone is known. Therefore the Viterbi alignment results in the alignment of the labels with its phonetic context. The Viterbi alignment is further defined below. It is often impractical to Viterbi align large quantities of speech on the basis of ranks. A more efficient method of alignment uses acoustic labels. The problem is that acoustic labels are needed in order to compute a Viterbi alignment, and an alignment is needed in order to determine the labels, which are based upon context-dependent label prototype vector signals. What is needed is a method to resolve this mutual dependency.

DISCLOSURE OF INVENTION

The present invention is a system and method for creating labels for speech recognition using context-dependent label prototype vectors. The system and method comprise a means for accepting training data. This training data is then labelled. After labelling, the data is tagged, i.e., associated with the proper phonetic context. The context-dependent label prototype vector which maximizes the likelihood of obtaining each frame of the tagged training data is identified. The label associated with the context-dependent label prototype vector with the highest likelihood is also associated with that frame of tagged training data.

BRIEF DESCRIPTION OF THE DRAWINGS

The foregoing and other objects, features and advantages of the invention will be apparent from the following more particular description of the preferred embodiments of the invention, as illustrated in the accompanying drawings, wherein.

Best Mode for Carrying Out the Invention

The System and method of the present invention involves model construction for arc rank recognition systems. The invention creates the labels necessary for leafemic baseform construction when the label prototype vectors are context-dependent and the context of a frame of speech is not known with certainty.

There are several modeling units that can be used as the baseform for speech modeling. Speech can be modelled a word at a time, or as fenones, i.e., short units of speech. Another technique is to model a word as a sequence of leafemes. A leafeme is a context-dependent model which corresponds to each phoneme in a word. The present invention utilizes leafemes as its model baseform.

Figure 1:
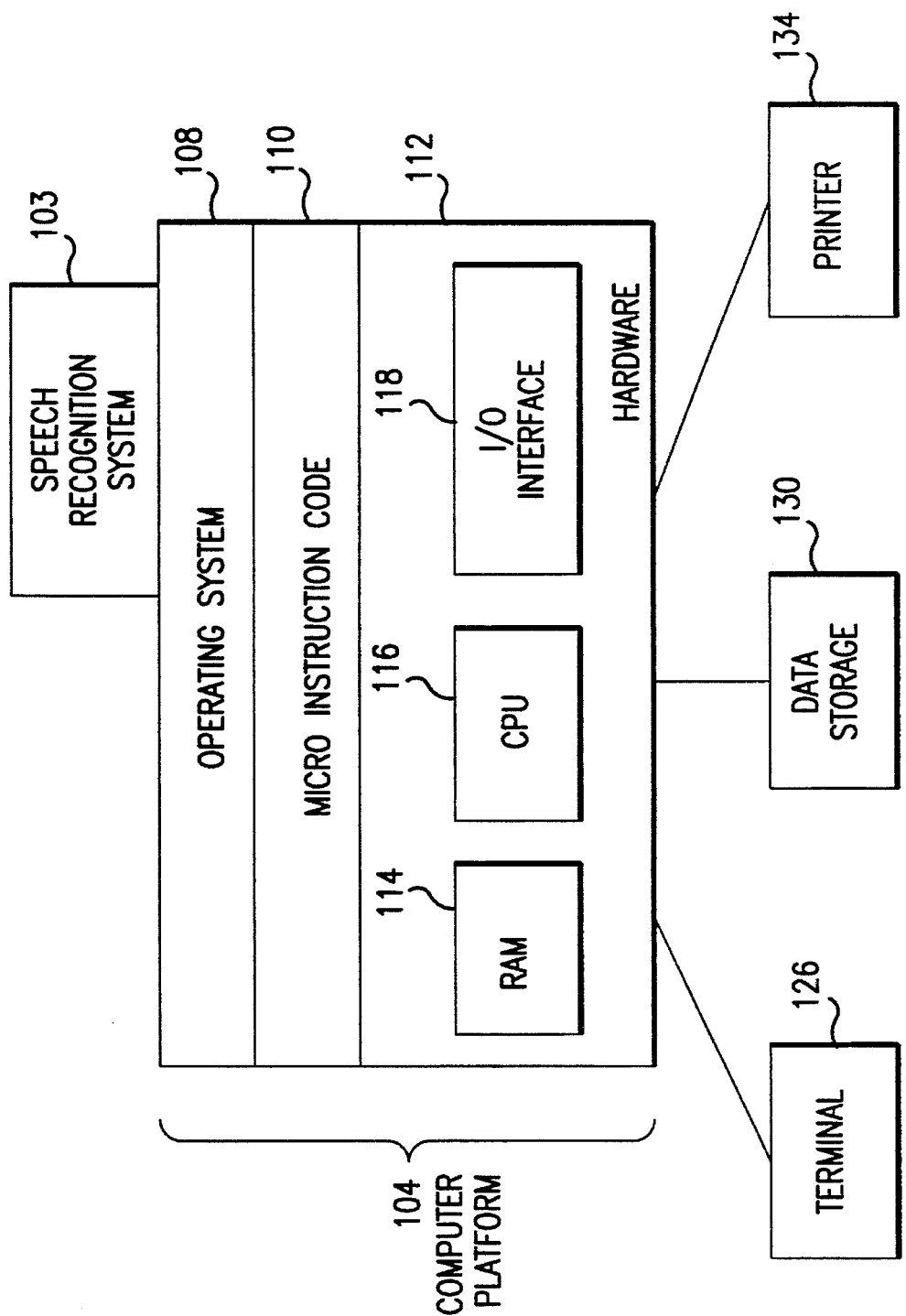
FIG. 1 is an illustration of a computer system incorporating the present speech recognition system.

FIG. 1 illustrates an environment in which a preferred embodiment of the present invention operates. The preferred embodiment of the present invention operates on a computer platform 104. The computer platform 104 includes certain hardware units 112 including one or more central processing units (CPU) 116, a random access memory (RAM) 114, and an input/output (I/O) interface 118. The computer platform 104 includes an operating system 108, and may include microinstruction code 110. A speech recognition system 103 may be part of the micro instruction code 110 or an application program to be executed via the operating system. Various peripheral components may be connected to the computer platform 104, such as a terminal 126, a data storage device 130, and a printing device 134.

Figure 2:
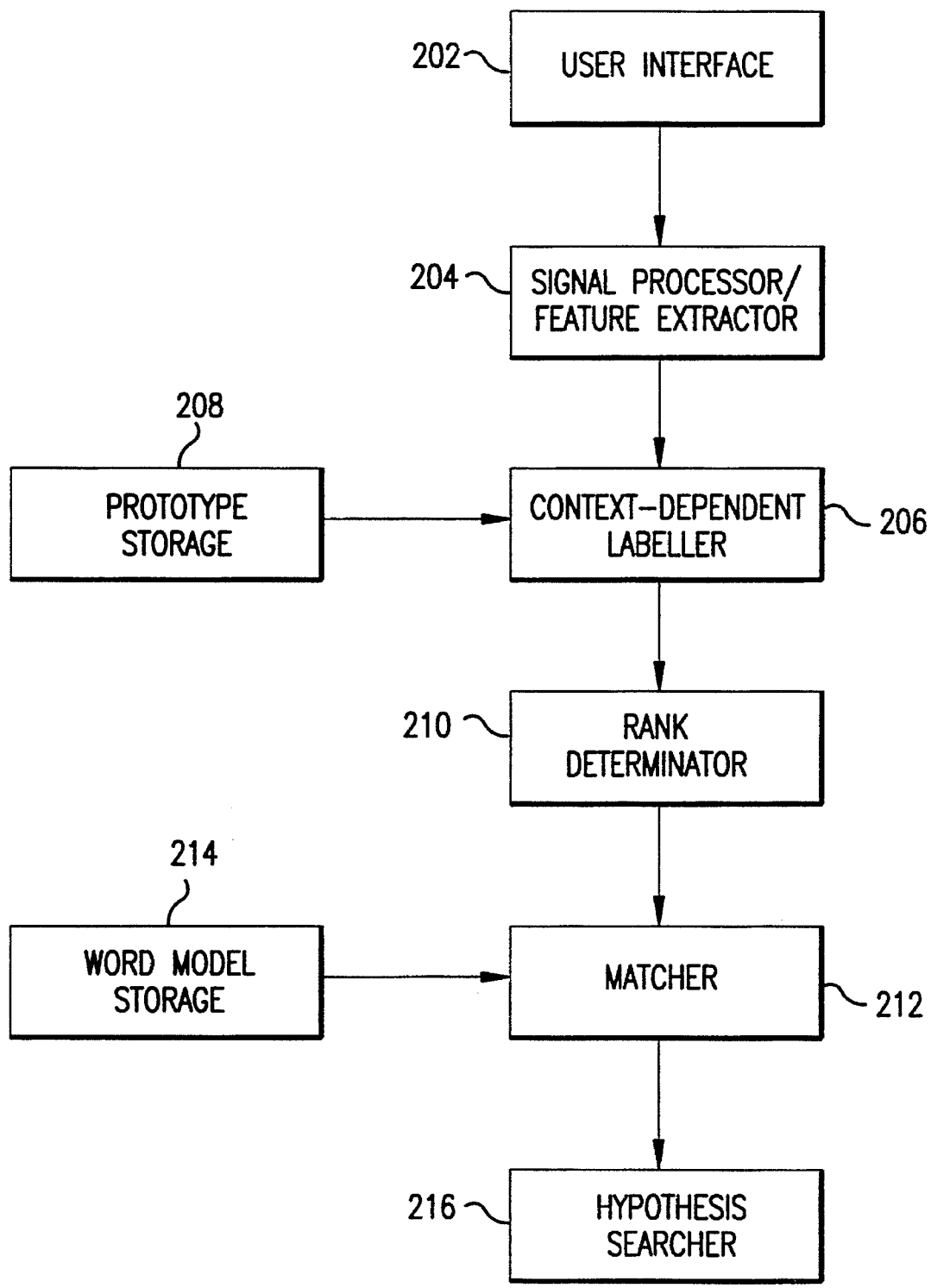
FIG. 2 is a more detailed illustration of the modules comprising the present speech recognition system.

FIG. 2 is a more detailed illustration of a speech recognition system 103. A user interface 202 may include a microphone for generating an analog electrical signal corresponding to a speech utterance. An analog to digital (A/D) converter may also be included in the user interface 202. The user interface 202 is coupled to a signal processor/feature extractor 204. The signal processor/feature extractor 204 receives the electrical signal output from the user interface 202 and produces signals representing a set of feature vectors, hereinafter feature vector signals, e.g., acoustic parameter vectors.

Figure 3:
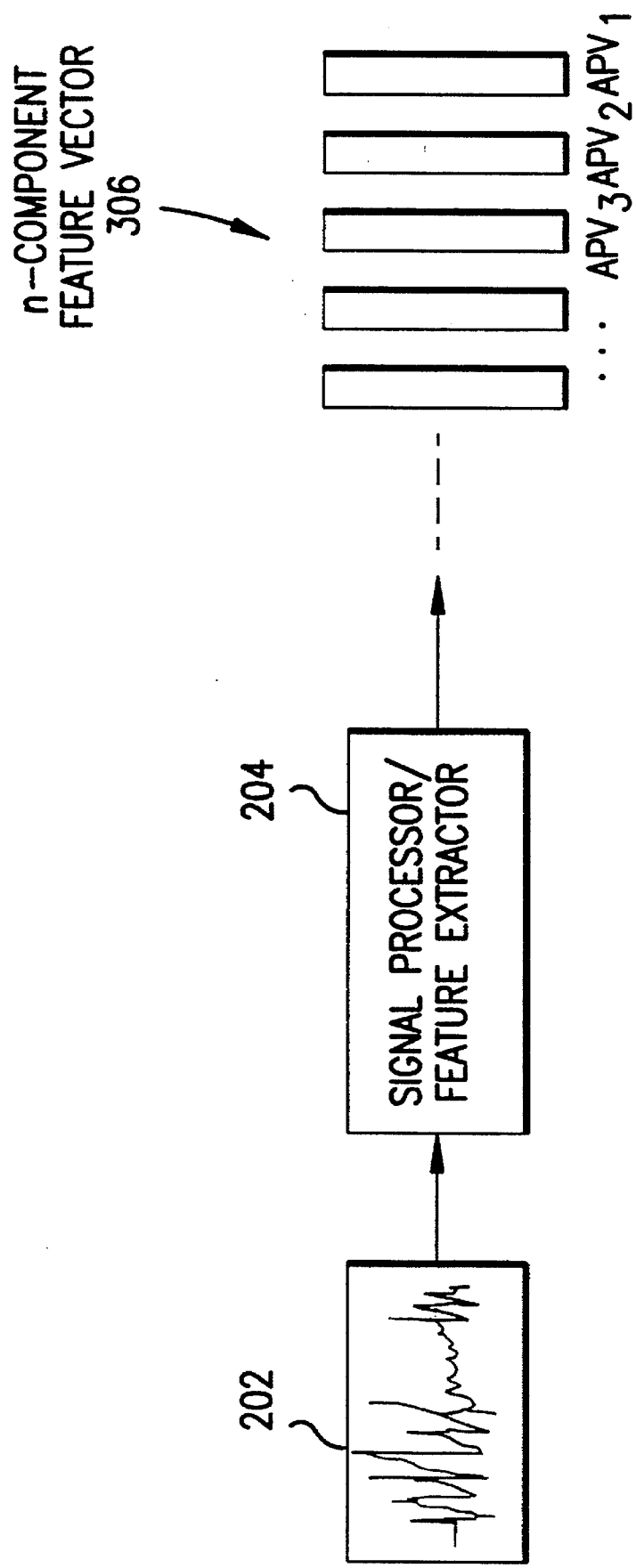
FIG. 3 is a simplified sketch of a method for extracting acoustic parameter vectors from a speech signal.

FIG. 3 illustrates this process in greater detail. Signal processor/feature extractor 204 can include electronic components such as an analog-to-digital converter (A/D) and a spectral analyzer. The output of the user interface 202 is coupled to the signal processor/feature extractor 204. For each interval of time, i.e., a frame, the signal processor/feature extractor 204 examines n-characteristics of speech. Based upon the values of the n characteristics, a signal representing an n-component feature vector 306 is defined. In the preferred embodiment, the signal processor/feature extractor 204 extracts signals representing a series of acoustic parameter vectors from the speech signal. One type of acoustic parameter vector signal, hereinafter acoustic parameter vector, that can be extracted is based upon the frequency of the signal. Measurement and spectral analysis of the speech signal by the signal processor/feature extractor 204 creates a frequency sensitive acoustic parameter vector. The spectral analysis comprises measuring the energy of the speech signal for each time unit in a number of different frequency bands n, which may be approximately 20. The time unit, i.e., frame, is small. Therefore the creation of many acoustic parameter vectors occurs every second.

The output of the signal processor/feature extractor 204 is coupled to a context-dependent labeller 206. The context-dependent labeller is also coupled to a prototype storage mechanism 208. For each feature vector the context-dependent labeller 206 computes and associates a score for every context-dependent label. The context-dependent labeller 206 then associates each feature vector with the context-dependent label having the highest score. The scores for each context-dependent label and the tagged feature vectors are output from context-dependent labeller 206. The context-dependent labeller 206 is coupled to a rank determinator 210. The rank determinator ranks the scores which were calculated in the context-dependent labeller 206.

A matcher 212 is coupled to a rank determinator 210, a word model storage 214 and a hypothesis searcher 216. The matcher 212 receives a word model from the word model storage 214 and the determined ranks from the rank determinator 210 and computes a score for each word model. This score is output to the hypothesis searcher where the word model with the highest score is chosen. The chosen word represents the system's determination as to the identification of the speech utterance.

Figure 4:
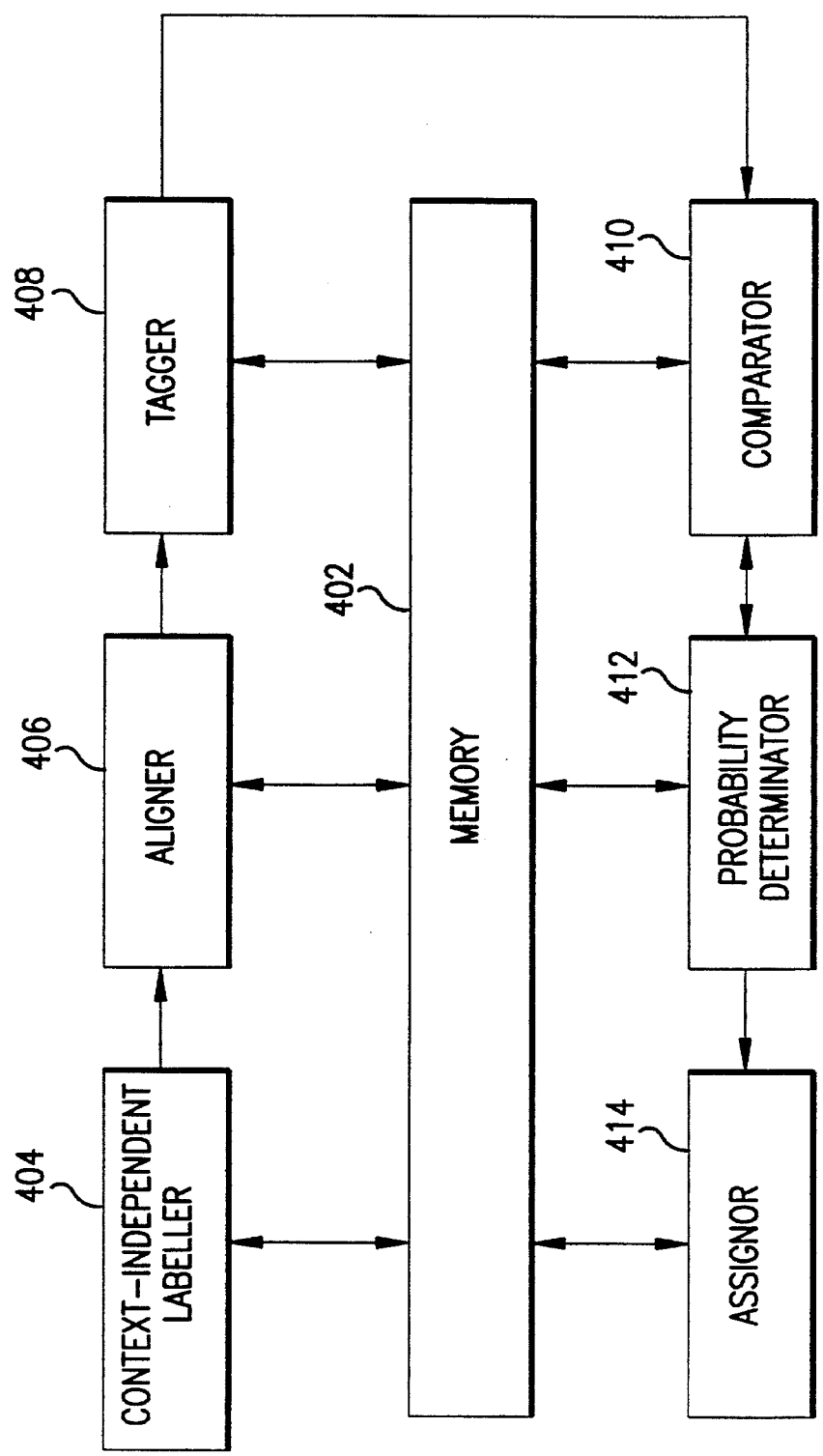
FIG. 4 is an illustration showing the modules of the context-dependent labeller of the present invention.

FIG. 4 illustrates the modules of the context-dependent labeller 206. The memory module 402 can be one or a combination of more than one data storage devices, e.g. floppy disks or random access memory (RAM). The preferred embodiment of the invention uses a computer's internal random access memory (RAM) as the memory module 402. A context-independent labeller 404 is coupled to the memory module 402 and an aligner 406. The aligner 406 is coupled to the memory module 402 and a tagger 408. The tagger 408 is coupled to the memory module 402 and a comparator 410. The comparator 410 is coupled to the memory module 402 and a probability determinator 412. The probability determinator is coupled to the memory module 402 and an assignor 414. The assignor is coupled to the memory module 402. The input data and output data for the context-dependent labeller 206 is stored in the memory module 402.

Figure 5:
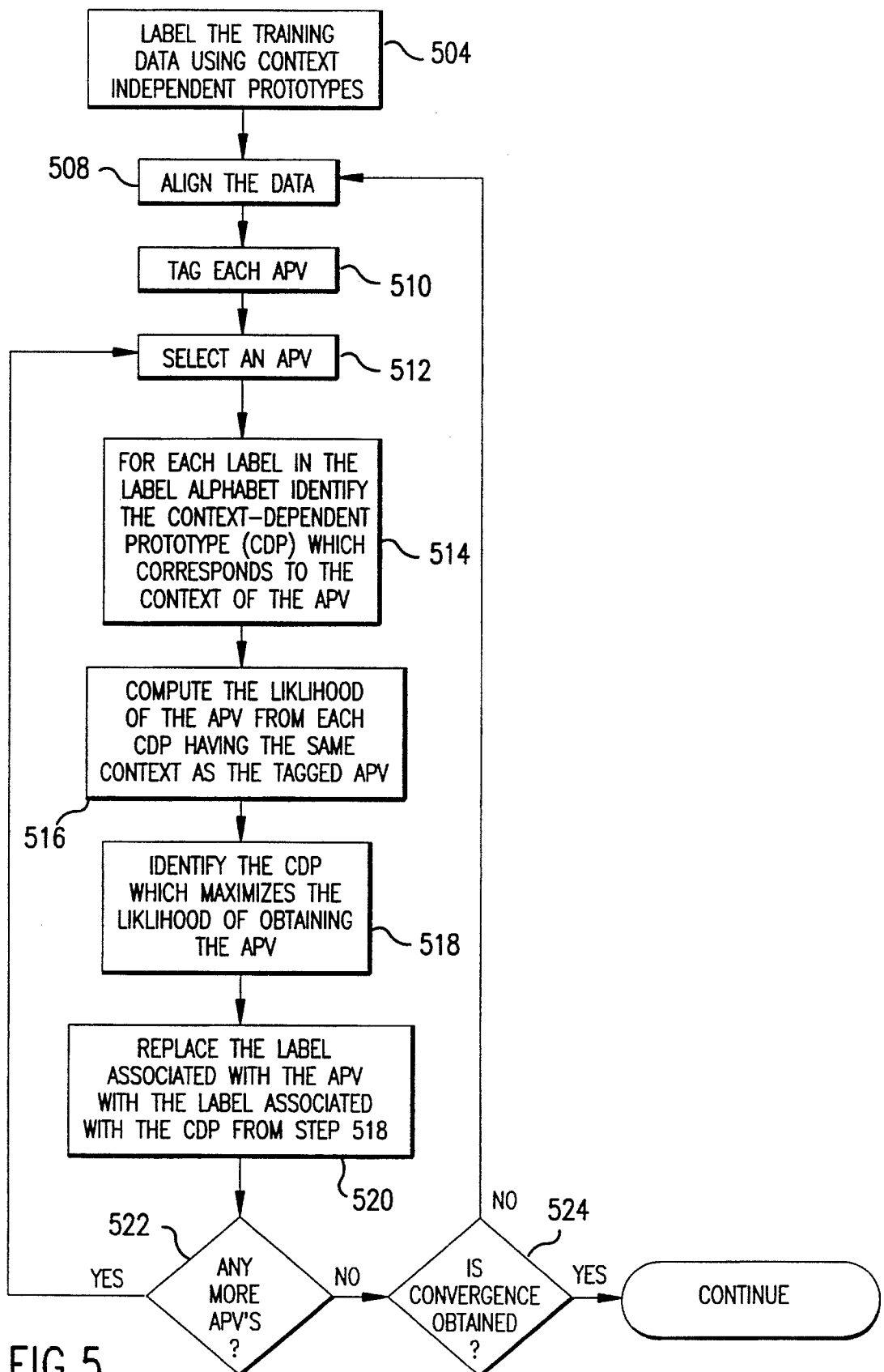
FIG. 5 is a flow diagram for the overall speech recognition system and method.

FIG. 5 illustrates the method of the context-dependent labeller's method of operation. Acoustic parameter vectors have been stored in the memory module by the speech processor/feature extractor 204. The context-independent labelling of these acoustic parameter vectors, step 504, occurs in the context-independent labeller 404. A label alphabet is known and has been stored in the memory module 402. Each label has a set of context-independent and context-dependent label prototype vector signals associated with it. These prototype vector signals have also been stored in the memory module 402 and are described below. A method for constructing context-dependent prototype vectors is discussed further in L. R. Bahl et al., "Context Dependent Vector Quantization for Continuous Speech Recognition", Proceedings from the International Conference on Acoustics, Speech, and Signal Processing, Minneapolis Minn. (April 1993), herein incorporated by reference. The construction of the context-independent prototype vectors are described below. The assignment of these labels to an acoustic parameter vector in step 504 uses context-independent label prototype vectors. Acoustic parameter vectors are labeled as different classes of sound in a process referred to as vector quantization, described below.

Figure 6:
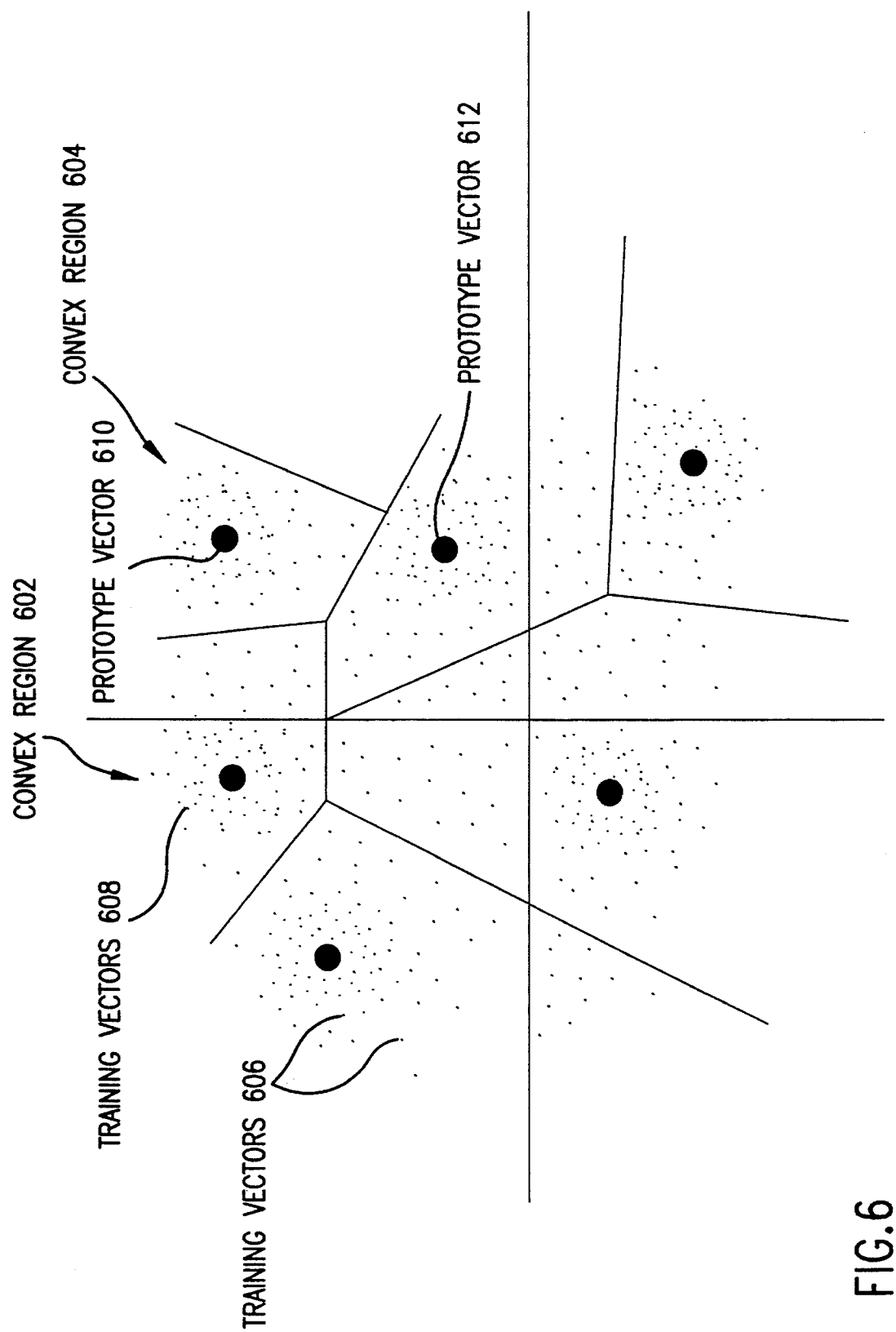
FIG. 6 is a two dimensional representation of a number of acoustic parameter vectors in space and the division of the feature vectors in a number of convex regions.

One technique for vector quantization involves separating different speech vectors into different clumps within memory module 402. Referring to FIG. 6 these clumps are divided into regions known as convex regions 602, 604. For simplicity in FIG. 6 we examine training data in the form of acoustic parameter vectors with only 2 dimensions. Such clumping of the different acoustic parameter vectors into regions is referred to as clustering. In essence the process of clustering involves calculating a mean value for each convex region by computing the respective mean values of the training vectors in each region. In FIG. 6 dots represent the training vectors 606, 608. The resulting mean value of the training vectors in each region is referred to as a prototype or a prototype vector 610, 612. Prototype vector 610 represents the mean of all training vectors in convex region 604.

These prototype vectors are stored in the prototype storage 208. In the preferred embodiment the prototype storage is located within the memory module 402. An identifier is assigned to each prototype vector. Each prototype vector also may be referred to as a class of sound. Context-dependent speech recognition systems and context-independent speech recognition systems each require a different set of prototype vectors. Both types of prototypes are stored in the memory module 402. Since context-dependent speech modelling models combinations of sounds, more classes of sounds, each having a prototype vector, exist.

In the preferred embodiment the method for discovering what class of sound an acoustic parameter vector is associated with is accomplished by determining the distance separating the acoustic parameter vector and the label prototype vector. The label prototype vector having the minimum difference is associated with the acoustic parameter vector. The identifier of that prototype vector is used to label this acoustic parameter vector. "Vector quantization" is the name of this process.

Each acoustic parameter vector must be identified as corresponding to a speech sound, or phoneme. In speech recognition each word is ordinarily represented as a string of speech sounds in memory module 402. For example, the model "k ae t" represents the word "cat." Since English spelling is irregular, the mere fact that a person knows the pronunciation of the word and the spelling of the word does not necessarily allow him to figure out what speech sounds represent the word. In the preferred embodiment each word maps onto a string of speech sounds or phonemes. Thus, a string of phonemes makes up each word. A phone is the symbol representing the phonemes. It requires an inventory of approximately 80 phones to enable a vector quantizer to generate the labels associated with the different sounds that make up the English language. Of course for a different language an inventory having a different number of sounds and labels is necessary.

Figure 7:
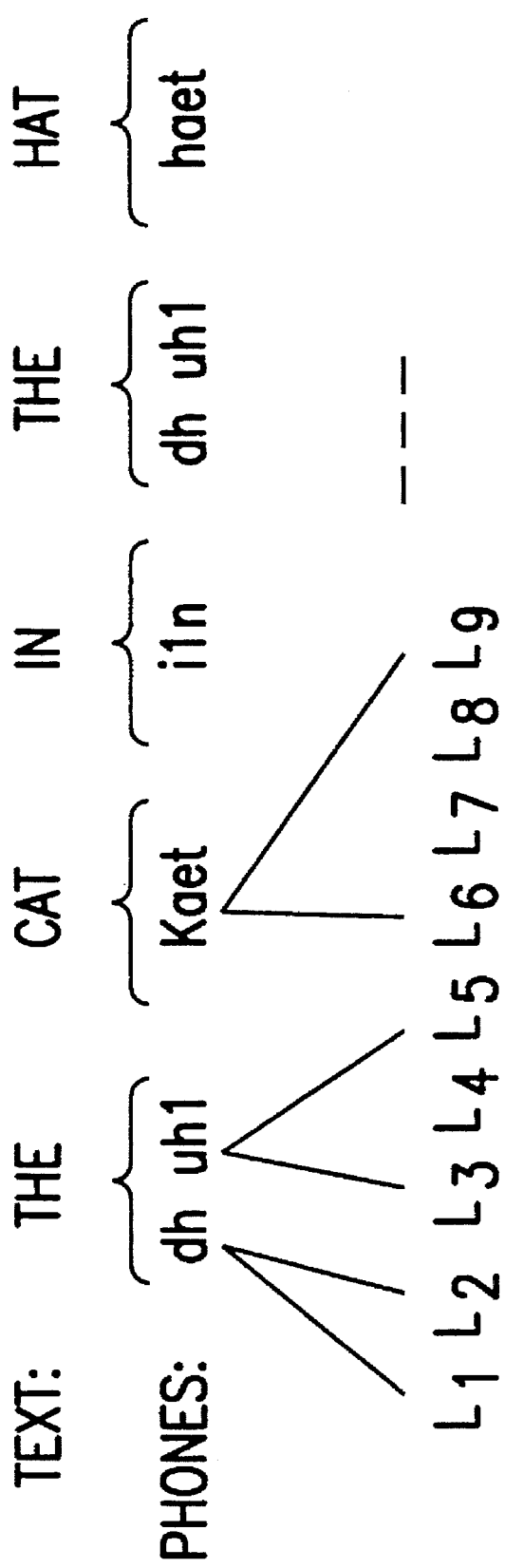
FIG. 7 is a diagram showing the correlation between a string of text and different sounds.
Figure 8:
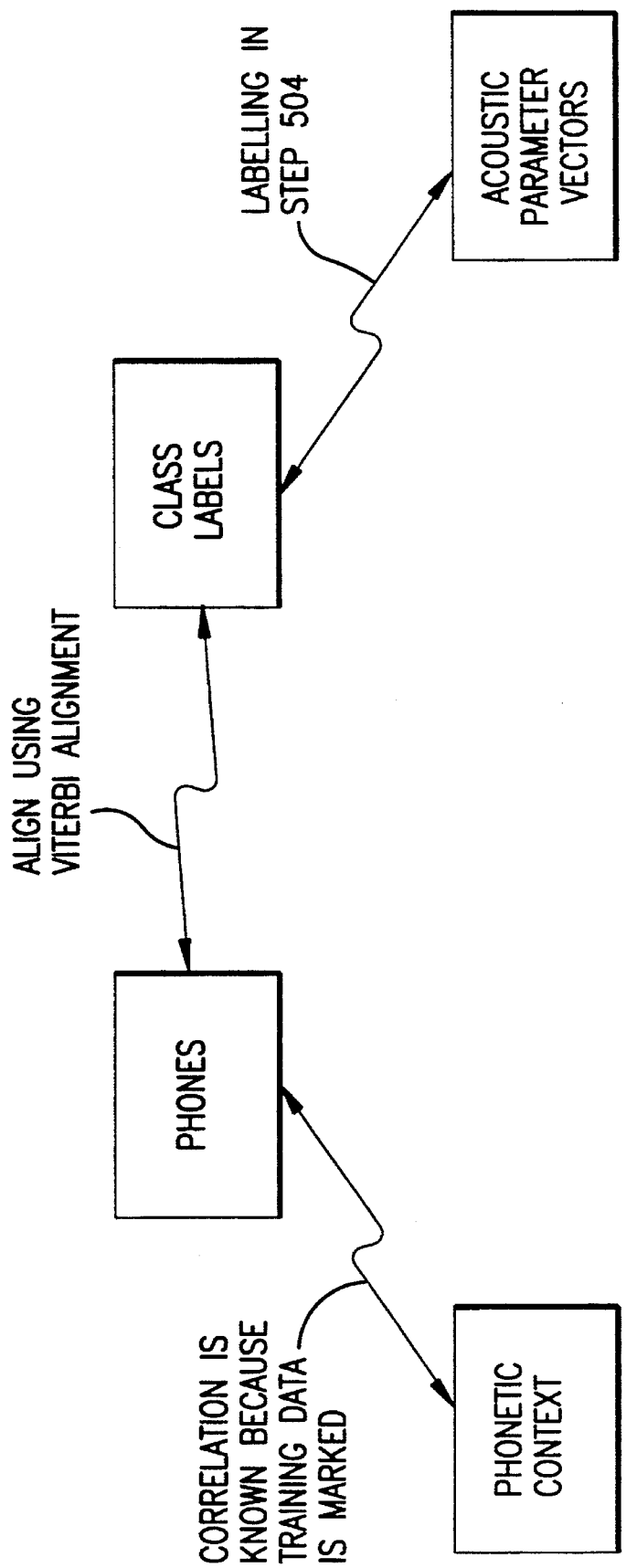
FIG. 8 is a diagram showing how the initial steps of the present invention affect the training data.

Correlating the different phones with the acoustic parameter vectors generated by the utterance of a word is done in the aligner module 406 using the well known "Viterbi Alignment" technique in step 508. For a more detailed discussion of the Viterbi Alignment technique, see F. Jelinek, *Continuous Speech Recognition by Statistical Methods*, Proc IEEE Vol. 64, 532–556, 1976, incorporated herein by reference. In essence, the Viterbi alignment technique uses Hidden Markov Model technology to align or correlate each phone in a given text for the purpose of determining what label (i.e. the output from the vector quantizer) each phone corresponds to. For illustration, FIG. 7 shows the text string "The Cat In The Hat" and the phones representing the sounds (phonemes) of this text string. The Viterbi Alignment aligns the phones and labels of the text string. That is, each phone has been identified with a corresponding label. For example the phone "dh" for the word "The" corresponds to labels $L_1$ and $L_2$. The phone "uhl" corresponds to the labels $L_3$, $L_4$ and $L_5$. Each acoustic parameter vector is associated with a context-independent label in step 504. After the correspondence between the labels and each phone is known, it follows that the acoustic parameter vector corresponding to each phone in the text string is also known, as shown in FIG. 8. Accordingly, correspondence between acoustic parameter vectors and phonemes can be established by the Viterbi alignment technique.

The context-independent label prototype vectors are based upon each individual phoneme without regard to the preceding or following phoneme. However, when speaking words, a particular phoneme actually varies depending upon the previous phoneme and/or the following phoneme. The articulation of a sound may vary substantially when articulated in context compared to when the sound is articulated in isolation. Thus, depending on what sounds precede and follow a phoneme, the pattern of energy concentrations of a phoneme will change. For example the phoneme "s" varies depending on whether it is followed by the phoneme "oo" like "sue" or by the phoneme "e" like "see." Therefore creating label prototype vectors which account for neighboring phonemes better models continuous speech. Accounting for the phonetic context results in context-dependent label prototype vectors. Each phoneme has many variations depending upon the neighboring phonemes. The phonetic context of the target phoneme is the combination of a target phoneme and neighboring phonemes. The marking of the training data with its phonetic context has occurred before the training data enters the invention. Therefore the exact phonetic context of each phone in the training data is known.

One goal of the present invention is to determine the most likely label sequence for each word in the system's vocabulary. Thousands of prototype vectors are necessary to model context-dependent speech systems. The Viterbi alignment 508 aligns the acoustic parameter vector with the corresponding phone. Since training data is being analyzed the alignment between the phone and the phonetic context is also known. As shown in FIG. 8, after the data alignment, the phonetic context for each acoustic parameter vector is also known.

After the acoustic parameter vector signals have been processed by the aligner 406 they are operated upon by the tagger module 408. Therefore, the next step is that each acoustic parameter vector signal is tagged, or associated with, the appropriate phonetic context in step 510. The tagger stores the tagged feature vector signal, in the preferred embodiment a tagged acoustic parameter vector signal, in the memory module 402.

Steps 512–520 are performed for each tagged acoustic parameter vector. An acoustic parameter vector is selected in step 512. Determining which label should be associated with each acoustic parameter vector using context-dependent analysis is one accomplishment of the present invention. Initially the invention, in step 514, must identify the context-dependent label prototype vector corresponding to the phonetic context of a given acoustic parameter vector for each label. The comparator module 410 operates on the acoustic parameter vector after it has been tagged in the tagger module 408. For each label in the label alphabet the comparator module 410 determines whether each label has a prototype vector corresponding to the phonetic context associated with the tagged acoustic parameter vector. If such a prototype vector exists the probability determinator 412 determines the probability of obtaining the tagged acoustic parameter vector given this prototype vector in step 516. In the preferred embodiment the probability determinator 412 determines the probability using Hidden Markov Models. The comparator 410 and probability determinator 412 continue this process for each label of the label alphabet.

The comparator module 410 and probability determinator module 412 determine the probability of achieving the acoustic parameter vector for each label having a context-dependent prototype which corresponds to the same phonetic context as said tagged acoustic parameter vector, step 516, and stores this information in the memory module 402. The assignor module 414 obtains this information from the memory module 402 and identifies the context-dependent prototype vector having the highest probability of producing the acoustic parameter vector in step 518. The assignor 414 retrieves the label associated with this context-dependent prototype vector from the memory module 402 and replaces the old label associated with the acoustic parameter vector in step 520. Recall that the old label associated with the acoustic parameter vector is the result of context-independent labelling that occurs in the context-independent labeller 404 during step 504.

At this point the given acoustic parameter vector is identified with a label based upon a context-dependent prototype vector. This information is stored in the memory module 402. Steps 512–520 are repeated for all acoustic parameter vectors as shown in step 522.

After the identification of all acoustic parameter vectors is complete steps 508–522 may be repeated until convergence in the sequence of labels is obtained at step 524. When repeating steps 508–522 the labels and the phones may be aligned differently in step 508, if they are aligned differently then the labels assigned to the acoustic parameter vectors in step 520 may be different and therefore convergence is not achieved in this iteration. The identification as well as the score for each label/acoustic parameter vector combination is stored in the memory module 402. Subsequent Hidden Markov Modules are derived from the new label information which may be used, for example, in an arc rank system.

One measure of performance for speech recognition systems is the phone/label mutual information. The phone/label mutual information is a measure of how the phone and label correspond to each other. For example, if a phone uniquely identifies a label the phone/label mutual information is at a maximum for this phone and label. If two phones correspond to one label the phone/label mutual information is less for these phones and label, i.e., the correspondence is not as "sharp". The mutual information is reduced when more labels can be output for a given phone, or when more phones can correspond to a particular label. If every phone produced exactly the same distribution of labels the mutual information between phones and labels is zero because if a phone is given no information can be gleaned as to what label is produced.

One iteration of the method of the current invention was applied to five hundred sentences of continuous speech obtained from a single speaker. The phone/label mutual information obtained with phoneme-based Hidden Markov Model word models and a label alphabet size of 210, improved from 3.25 to 3.53 bits when replacing the labels from the context-independent labeller 404, i.e., replacing the labels from step 504 with the labels from the assignor module 414 in step 520. The labels of step 520 were obtained from 12,093 context-dependent label prototype vectors each of which consisted of a mixture of two diagonal gaussians.

While the invention has been particularly shown and described with reference to a preferred embodiment thereof, it will be understood by those skilled in the art that various change in form and details may be made therein without departing from the spirit and scope of the invention.

Having thus described our invention, what we claim as new and desire to secure by Letters Patent is:

1. A computer based speech recognition system for labeling speech using context-dependent label prototype vectors, the system having an input comprising a sequence of phones from a training text, each of said sequence of phones having an associated phonetic context the system comprising:

a user interface configured to receive spoken sounds corresponding to a spoken version of the training text, and further configured to generate an outpt signal representative of said spoken sounds;

a signal processor, coupled to said user interface, configured to convert said output signal into a series of feature vector signals; and a context-dependent labeller, coupled to said signal processor, configured to assign a context-dependent label to each feature vector signal of said series of feature vector signals to result in tagged feature vectors, comprising:

aligning means, coupled to said signal processor, for aligning each of said feature vector signals with a corresponding phone to result in aligned feature vector signals, tagging means, coupled to said aligning means, for tagging each of said aligned feature vector signals with the phonetic context associated with said corresponding phone to result in tagged prototype vector signals, and first associating means, coupled to said tagging means, for associating a label with each of said tagged prototype vector signals based upon a context-dependent prototype vector signal, comprising:

phonetic context identifying means for determining, for each said label, whether a context-dependent prototype vector signal exists corresponding to the phonetic context of the tagged prototype vector signal, matching score generating means, coupled to said phonetic context identifying means, for generating a score for achieving said tagged feature vector signal given each of said context-dependent prototype vector signals having the same phonetic context as the tagged feature vector signal as determined in said phonetic context identifying means, and associating means, coupled to said matching score generating means, for associating a label which is associated with a context-dependent prototype vector signal having the highest score as generated by said matching score generating means with said tagged feature vector signal.

2. The system of claim 1, further comprising:

modeling means, coupled to said signal processing means, for modeling feature vector signals using Hidden Markov models.

3. The system of claim 1, wherein said aligning means comprises a Viterbi aligner.

4. The system of claim 1, further comprising:

storing means, coupled to said association means, for storing said labels which are based upon said context-dependent prototype vectors.

5. The system of claim 1, further comprising:

ranking means, coupled to said matching score generating means, for ranking one or more context-dependent label prototype vector signals based upon said context-dependent label's score as generated in said matching score generating means.

6. The system of claim 5, further comprising:

storing means, coupled to said ranking means, for storing said context-dependent label prototype rank for said tagged feature vector signals having an input coupled to said ranking means and having an output.

7. The system of claim 1, further comprising:

storing means, coupled to said matching score generator means, for storing said scores generated by said matching score generator means for each tagged feature vector signal given each of said context-dependent prototype vector signals having the same phonetic context as said tagged feature signal.

8. A method for creating labels which are necessary for leafemic baseform construction, wherein a spoken version of a training text is converted into signals representing feature vectors in a signal processor, and wherein a sequence of phones are input from said training text each phone having a phonetic context associated with it, said phonetic context comprising one or more phones occurring immediately prior to or subsequent to said phone, context-independent prototype vectors and context-dependent prototype vectors having previously been stored in a memory module, comprising the steps of:

(1) matching each of said feature vector signals with a most similar signal representing a context-independent label prototype vector said most similar signal determined by comparing one or more parameters of said feature vector signal with one or more parameters of each of said signals representing said context-independent label prototype vectors, which is stored in the memory module, to label each of said feature vector signals with said most similar signal representing a context-independent label;

(2) aligning each of said context-independent labelled feature vector signals with a corresponding phone from said training text;

(3) tagging each of said aligned feature vector signals with the phonetic context associated with said corresponding phone;

(4) identifying signals representing one or more context-dependent label prototype vectors having the same phonetic context of a given tagged feature vector signal;

(5) determining the score for achieving a feature vector signal given each of the context-dependent label prototype vector signals identified in step (4);

(6) identifying a context-dependent label prototype vector signal which maximizes the score of said feature vector signal as determined in step (5);

(7) replacing the context-independent label associated with said feature vector signal with a label associated with said maximum score context-dependent label prototype vector signal as identified in step (6) to label said feature vector signal with a context-dependent label; and (8) repeating steps (4)–(7) for each tagged feature vector signal.

9. The method of claim 8, further comprising the step of (9) repeating steps (2)–(8) as necessary to achieve a desired level of convergence of said labels.

10. The method of claim 8 wherein said feature vector signals are received in the form of a series of acoustic parameter vector signals.

11. The method of claim 8 further comprising a step, immediately preceding step (1), of modelling said feature vector signals using Hidden Markov Models.

12. The method of claim 8 wherein step (2) includes, using the Viterbi Alignment technique to align said feature vector signals and said phones in a computer processor.

13. The method of claim 8 wherein step (5) includes, using Hidden Markov Models to determine said score.

14. The system of claim 8 further comprising a step, following step (5), of ranking said context-dependent label prototype vector signals according to the score determined in step (5) and storing said rank in the memory module.

* * * * *